United States Patent
Chiba

[19]

[11] Patent Number: 6,118,590
[45] Date of Patent: Sep. 12, 2000

[54] SMALL-TYPE IMAGING OPTICAL SYSTEM

[75] Inventor: Masahiro Chiba, Hachioji, Japan

[73] Assignee: Olympus Optical Co., Ltd., Tokyo, Japan

[21] Appl. No.: 09/271,147

[22] Filed: Mar. 17, 1999

[30] Foreign Application Priority Data

Mar. 19, 1998 [JP] Japan .................................. 10-070516

[51] Int. Cl.$^7$ ............................ G02B 21/02; C03B 21/00
[52] U.S. Cl. ............................ 359/642; 359/661; 65/102
[58] Field of Search .................................. 359/642, 718, 359/661; 65/102, 323, 103–106

[56] References Cited

U.S. PATENT DOCUMENTS

| | | | |
|---|---|---|---|
| 4,629,489 | 12/1986 | Hirota et al. ................................ | 65/102 |
| 4,836,840 | 6/1989 | Hirota et al. ............................... | 625/323 |
| 4,913,718 | 4/1990 | Yamamoto et al. ......................... | 65/104 |
| 5,026,415 | 6/1991 | Yamamoto et al. ......................... | 65/305 |
| 5,168,404 | 12/1992 | Miyazaki et al. .......................... | 359/718 |
| 5,202,156 | 4/1993 | Yamamoto et al. ...................... | 427/135 |
| 5,246,198 | 9/1993 | Kurihara ............................... | 65/374.15 |
| 5,340,373 | 8/1994 | Miyazaki ..................................... | 65/24 |
| 5,380,349 | 1/1995 | Taniguchi et al. .......................... | 65/286 |
| 5,382,274 | 1/1995 | Yamamoto et al. .......................... | 65/26 |
| 5,630,859 | 5/1997 | Takagi et al. ............................... | 65/102 |
| 5,724,190 | 3/1998 | Tachihara et al. ........................ | 359/661 |
| 5,817,161 | 10/1998 | Takagi et al. ............................... | 65/102 |

Primary Examiner—Georgia Epps
Assistant Examiner—Evelyn A. Lester
Attorney, Agent, or Firm—Arnold International; Bruce Y. Arnold

[57] ABSTRACT

A lens element is disclosed which satisfies the following three conditions

| | |
|---|---|
| $|\Delta h/R| \geq 0.1$ | ... Condition (1) |
| $\Phi \leq 8$ mm | ... Condition (2) |
| $Tg \leq 530°$ Centigrade | ... Condition (3) | where $\Delta h$ is the change in height of the lens element surface as measured from the lens element vertex to its edge, R is radius of curvature of the lens element near the optical axis, $\Phi$ is the outer diameter of the lens element, and Tg is the glass transition point of the lens element. Further, if the optical material of the lens element includes lead, then its glass transition point Tg must be no more than 490 degrees to avoid the lead being precipitated onto the surface of the mold during the pressing, thereby forming a defect in the lens element. The lens element finds use in a pick-up optical system of an endoscope, and other optical systems where a small diameter lens element having a strong surface curvature is required. For a lens element of outer diameter $\Phi$ which satisfies Condition (2), Condition (1) is satisfied only if the radius of curvature R of a surface of the lens element is less than 9.2 mm.

9 Claims, 3 Drawing Sheets

SMALL-TYPE IMAGING OPTICAL SYSTEM

BACKGROUND OF THE INVENTION

An optical system which uses a small-type image pick-up lens element having an outer diameter of several millimeters or less has primarily been used in the prior art as an image pick-up optical system of an endoscope. However, image pick-up optical systems have recently been used for various other applications as well. The image pick-up lens element of an optical system of an endoscope has been manufactured by the same process conventionally used for making the lens elements of photographic cameras and microscopes. That is, one surface of the lens element surface undergoes a rough grinding, followed by a precise grinding, and then a polishing. The other surface of the lens element is then processed similarly.

There has been a demand for further reduction in the size of image pick-up optical systems. Moreover, it does not appear that conventional manufacturing processes are well-suited for manufacturing lens elements of the size required. For example, in an image pick-up optical system of an endoscope, the trend has been to reduce the diameter of the endoscope as well as the length of the non-flexible end portion that is suitable for housing the image pick-up optical system Thus, a smaller diameter lens element having higher refractive power is required. However, accurately manufacturing and mounting such a lens element, as well as inspecting the lens element for accuracy of manufacture and mounting, becomes more difficult as the lens element is made smaller. When the lens element surfaces are processed in the conventional manner, as the size of the optical system is decreased the lens element construction becomes more difficult, the tolerance of the optical system for normal manufacturing and assembly variations decreases, and the number of inspections needed to assure high quality increases.

Meanwhile, there have been recent improvements in the technology of using a mold to simultaneously form opposite surfaces of a lens element by pressing the optical material into the desired shape. Such a molding technique has mainly been used to form aspherical lens elements used in photographic cameras. Of course, this requires that both dies be manufactured with high precision and accuracy, as a die's imperfection(s) will be transferred to each lens element surface produced by the die. However, once a die set of high accuracy and precision has been prepared and inspected, there is little need to inspect each lens element produced by the die set. Therefore, if a molding technique can be applied to the manufacturing of a lens element having a small outer diameter and strong surface curvature, the problem of an excessive number of inspections being required in order to assure high quality of such a lens element will be decreased.

In the usual molding technique for manufacturing a lens element for a photographic camera, a preform material having a shape that approximates that of the final lens element is first molded with a die set by pressing. For this reason, the amount of displacement in the final press molding of a camera lens element is very small. However, when molding very small lens elements such as used in endoscopes, it is necessary to mold the lens element in a one-step process from a parallel plate material in order to keep the cost per lens element produced from becoming excessive. Thus, the amount of displacement of the moveable die of the die set in pressing such a lens element is inevitably large. This requires that the lens element material be heated to a temperature above the glass transition point, and that the pressing occurs in such a state.

A glass material S-BSL7, made by the Ohara Corporation, having a glass transition point of 565 degrees Centigrade has been unsuccessfully tested for molding very small diameter lens elements having strong surface curvatures, as used in endoscopes. Because the molding temperature must be high, as discussed above, and because the diameter of the lens is very small, a large pressure must be applied to the molding surface of the die. For this reason, part of a protective film formed on the molding surface to protect the die peals. To overcome this difficultly a glass material SF11 (made by Schott Glass), which has a glass transition point of 503 degrees Centigrade and which contains lead, was tested. Although the protective film of the molding surface of the die does not peal in this instance, the lead in the glass tends to precipitate onto the surface of the die and to adhere to it during the molding process.

When either peeling of the film on the molding surface or precipitation of lead onto it occurs, a defect results on the surface of a lens that is press-formed by the die. For this reason, making a small diameter lens element having a strong surface curvature (as used, for example, in an optical image pick-up system of an endoscope) by the prior art molding technique has been impossible. In the case of a small-sized optical system apparatus as used for an image pick-up of an endoscope, the diameter of beam carrying image information is necessarily small as compared with an optical system apparatus of a usual photographic camera. Thus, even if the surface defect of the image pick-up lens is very small, the amount of degradation of image quality is large. This requires that the molding surface of each die be made with high precision and accuracy.

BRIEF SUMMARY OF THE INVENTION

The present invention is to a lens element, and to an optical system which includes such a lens element, which satisfies at least three prescribed conditions if the lens element material does not contain lead, and which satisfies a fourth condition if the lens element material contains lead.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
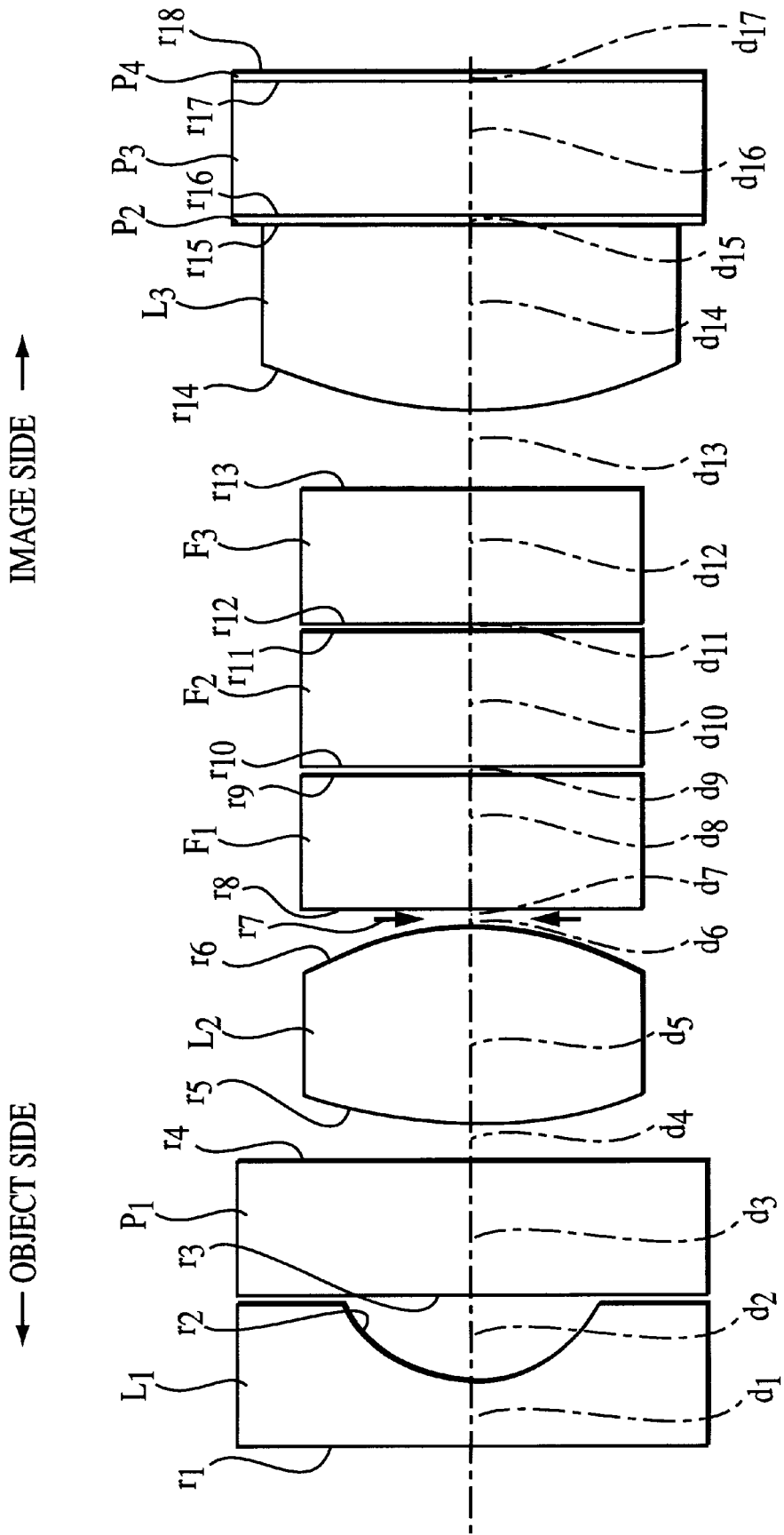
FIG. 1 shows a first example of an image-pickup optical system of an endoscope having a lens element made according to the present invention.

The present invention is to a lens element, and to an optical system which includes such a lens element, which satisfies Conditions (1), (2) and (3) below for a lens element material which does not contain lead, and which additionally satisfies Condition (4) below for a lens element material which contains lead.

| | |
|---|---|
| $\|\Delta h/R\| \geq 0.1$ | ... Condition (1) |
| $\Phi \leq 8$ mm | ... Condition (2) |
| $Tg \leq 530°$ C. | ... Condition (3) |
| $Tg \leq 490°$ C. | ... Condition (4) | where $\Delta h$ is the change in height of a surface of the lens element as measured from the lens element vertex to its edge (i.e., $\Delta h = R^2 - \{R^2 - (\Phi/2)^2\}^{1/2}$);

R is the radius of curvature of the lens element surface (as measured at the vertex of the lens element in the case of an aspherical lens element);

$\Phi$ is the outer diameter of the lens element; and

Tg is the glass transition point of the lens element.

Condition (1) defines a minimum for the ratio of the change in height of the lens surface (from its center to its edge) divided by its radius of curvature. The mass production of a lens element by the technique, discussed above, of grinding and polishing is feasible when this ratio is lower than the value specified. However, when meeting Condition (1), several lens elements can not be polished at once, and thus molding of the lens element becomes especially advantageous.

When Condition (2) is met, the outer diameter of the optical system is small. If, for example, the outer diameter of the lens element is the maximum permissible amount of 8 mm, then condition (1) is satisfied only if the radius of curvature of the lens element is about 9.2 mm or less. Therefore, conditions (1) and (2) are jointly satisfied only by a very small lens element having a very strong surface curvature. For example, for a lens element of outer diameter $\Phi=8$ mm, Condition (1) is satisfied only if the radius of curvature R of a surface of the lens element is less than about 9.2 mm For smaller values of $\Phi$, Condition (1) is satisfied only by still smaller values of R.

Condition (2) shows the lens diameter range suited for lens processing by molding. However, since lenses that satisfy the condition (2) have a small outer diameter, even a small defect in a lens surface will lower the performance. Accordingly, in order to make it so that small defects do not occur in the lens surfaces, it is desirable that glass material be used that satisfies condition (3). Furthermore, if there is glass material that satisfies condition (3), lens formation can occur by a one-time processing. In particular, if parallel planar lenses are used, it is desirable that the number of production process steps be decreased.

For temperatures above 530 degrees Centigrade, a protective surface that is applied to the die partially peels away from the die as a result of the high temperature and pressure. However, when glass material that contains lead was used for the lens material, and conditions (1)–(3) were satisfied, the lead included in the glass material precipitated and adhered to the surface of the die, thereby causing a defect in the lens element that was produced by the die. Therefore, when an optical material which contains lead is used for the lens element, it is necessary to also satisfy Condition (4). This allows the die temperature to be reduced during pressing (as compared to using a lens material having a Tg more than 490 degrees Centigrade) and prevents the lead in the lens material from being precipitated onto the die surface.

Furthermore, in those instances where the lens element is 5 mm or less in outer diameter, fully automated manufacture of the lens element had been precluded by previous manufacturing techniques, as it was thought necessary that skilled craftsman must polish each surface of such a lens element. This, of course, increases the cost of manufacture and may also result in greater variability of quality. However, so long as either surface of the lens element satisfies Condition (1), then both surfaces of the lens element may be formed by being molded, thereby decreasing the cost of manufacture.

Figure 2:
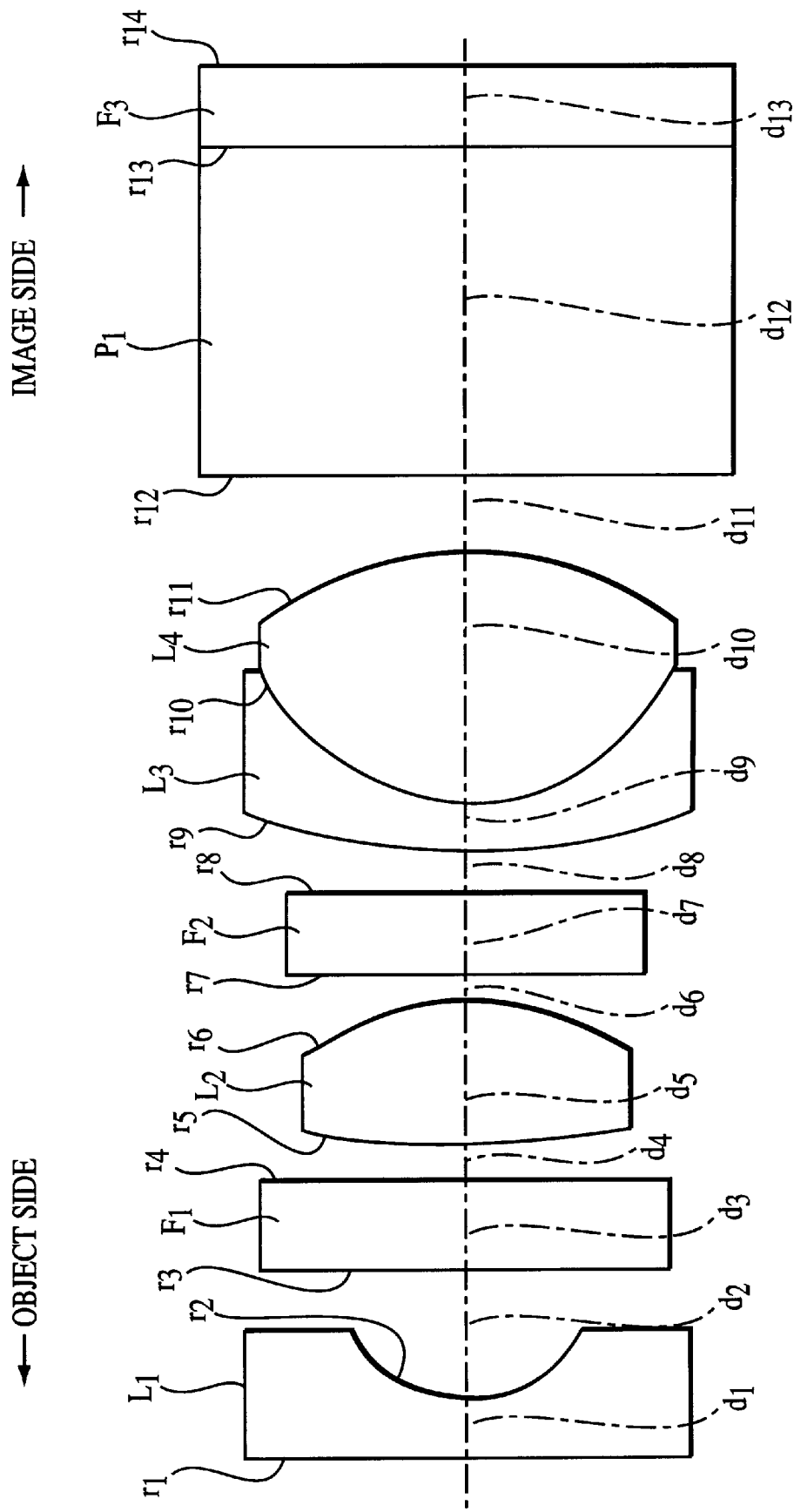
FIG. 2 shows a second example of an image-pickup optical system of an endoscope having a lens element made according to the present invention.
Figure 3:
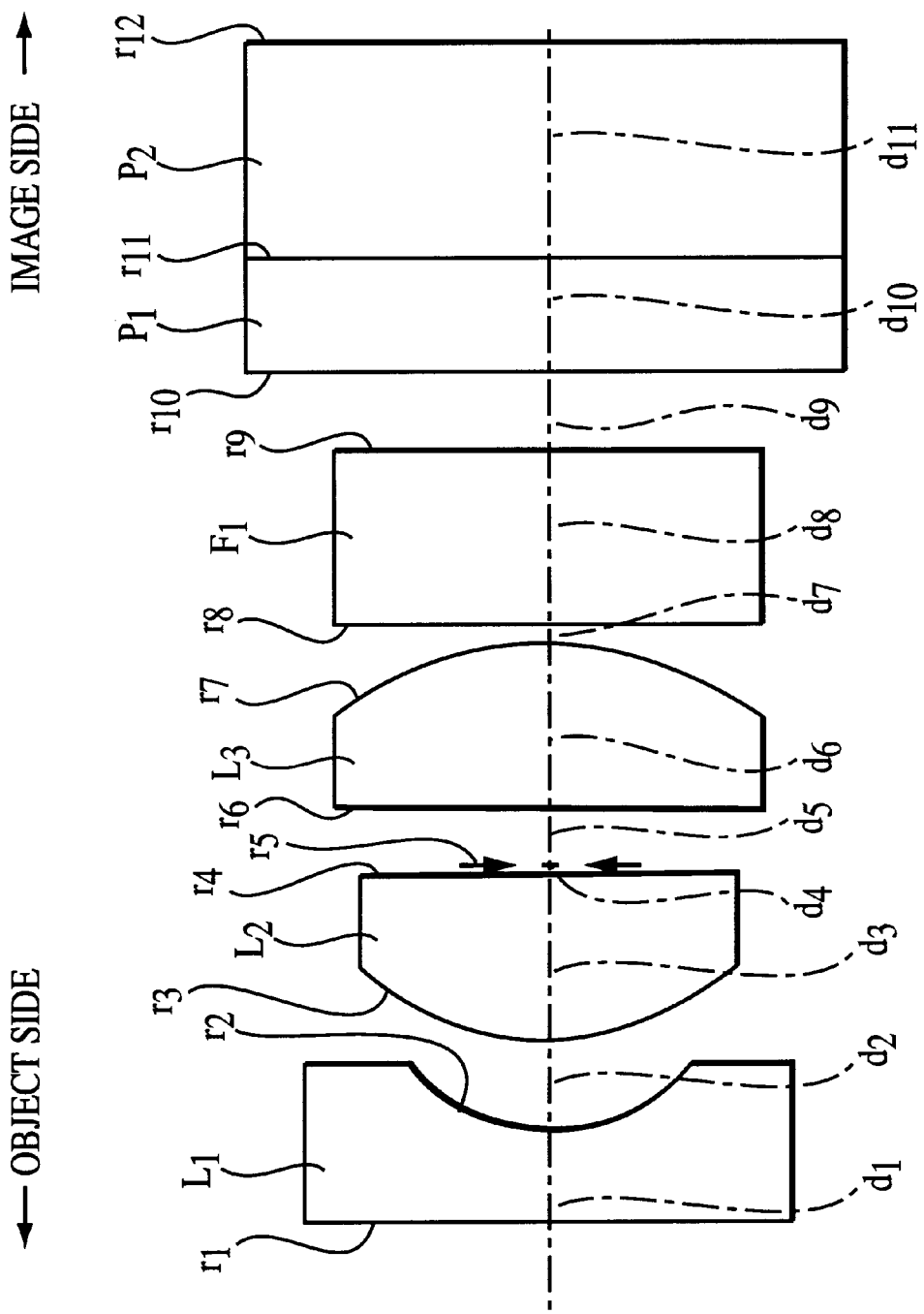
FIG. 3 shows a third example of an image-pickup optical system of an endoscope having a lens element made according to the present invention.

Three specific embodiments of an optical system apparatus for an image pick-up using a lens element made according to the invention will now be set forth. FIGS. 1–3 illustrate each respective embodiment. In each figure, the object side of the optical system is on the left side of the drawing.

Embodiment 1

FIG. 1 shows the components of an optical system of an image pick-up for an endoscope according to Embodiment 1. The components include, in order from the object side: plano-concave lens element $L_1$ with its concave surface on the image side, parallel plate $P_1$, bi-convex lens element $L_2$, parallel plates $F_1$, $F_2$ and $F_3$, plano-convex lens element $L_3$ with its convex surface on the object side, and parallel plates $P_2$, $P_3$ and $P_4$. Parallel plates $F_1$ and $F_3$ are filters which block the light of a YAG laser. Parallel plate $F_2$ is a filter for color temperature correction. Parallel plate $P_3$ is the cover glass of a CCD array. The thin parallel plates $P_2$ and $P_4$ are bonded onto respective sides of parallel plate $P_3$. Plano-convex lens element $L_3$ is bonded to the object side of parallel plate $P_2$, and an aperture is arranged between bi-convex lens element $L_2$ and parallel plate $F_1$.

Moreover, bi-convex lens element $L_2$ and plano-convex lens element $L_3$ are formed by pressing a parallel plate optical material SFn3 (made by the Sumita Optical Glass, Inc.) with a die. This product has a glass transition temperature of 415 degrees Centigrade and contains lead. The outer diameter $\Phi$ of the bi-convex lens element $L_2$ is 1.00 mm and of the plano-convex lens element $L_3$ is 1.25 mm. The value of $\Delta h/R$ of $L_2$ is 0.0417 mm on the object side and is 0.1497 on the image side. The value of $\Delta h/R$ of $L_3$ is 0.1154 on the object side. In addition, the outer diameter of plano-concave lens element $L_1$ and parallel plate $P_1$ are 1.4 mm, and the parallel plates $F_1$, $F_2$, and $F_3$ each have an outer diameter of 1 mm. Table 1 below gives, in order from the object side, the surface number #, the radius of curvature R near the optical axis of each surface, the on-axis spacing d of each surface, the refractive index $n_d$ (at the sodium d-line) and the Abbe number $\nu$.

TABLE 1

| # | R | d | $n_d$ | $\nu$ |
|---|---|---|---|---|
| 1 | ∞ | 0.2000 | 1.90135 | 31.55 |
| 2 | 0.4600 | 0.2630 | | |
| 3 | ∞ | 0.4000 | 1.51118 | 50.90 |
| 4 | ∞ | 0.1050 | | |
| 5 | 1.7500 | 0.5700 | 1.84666 | 23.90 |
| 6 | −0.9500 | 0.0200 | | |
| 7 | ∞(stop) | 0.0300 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.2299 | | |
| 14 | 1.3400 | 0.4699 | 1.84666 | 23.83 |
| 15 | ∞ | 0.0100 | 1.56384 | 60.70 |
| 16 | ∞ | 0.4000 | 1.51100 | 64.14 |
| 17 | ∞ | 0.0085 | 1.56384 | 60.70 |
| 18 | ∞ | | | |

Embodiment 2

FIG. 2 shows the components of an optical system apparatus for an image pick-up for an endoscope according to Embodiment 2. The components include, in order from the object side: plano-concave lens element $L_1$ with its concave surface on the image side, parallel plate $F_1$, bi-convex lens element $L_2$, parallel plate $F_2$, negative meniscus lens element $L_3$ with its convex surface on the object side, bi-convex lens element $L_4$, parallel plate $P_1$, and parallel plate $F_3$. Lens elements $L_3$ and $L_4$ are bonded together, as are parallel plate $P_1$ and parallel plate $F_3$. Although not illustrated, an aperture is arranged on object-side surface of parallel plate $F_2$. Once again, plates $F_1$, $F_2$ and $F_3$ are filters which block the light of a YAG laser.

Moreover, bi-convex lens element $L_2$ negative meniscus lens element $L_3$ and bi-convex lens element $L_4$ are formed by pressing a parallel plate optical material with a die. Bi-convex lens element $L_2$ is made of the optical material "VC81", which has a glass transition point of 510 degrees Centigrade and does not contain lead. This optical material is available from Sumita Optical Glass, Inc. (Japan). The outer diameter $\Phi$ of bi-convex lens element $L_2$ is 1.6 mm, its value of $\Delta h/R$ is 0.0099 on the object side and is 0.1945 on the image side. For negative meniscus lens element $L_3$, the optical material "FDS9" is used. This optical material is available from the Hoya Corporation (Japan). It has a glass transition point of 425 degrees Centigrade and contains lead. The outer diameter $\Phi$ of lens element $L_3$ is 2.2 mm, its value of $\Delta h/R$ is 1.0000 on the object side and is 0.0612 on the image side. For bi-convex lens element $L_4$, the optical material "P-BK40" which has a glass transition point of 501 degrees Centigrade and does not contain lead is used. This optical material is available from Sumita Optical Glass, Inc. (Japan). This lens element has an outer diameter $\Phi$ of 2 mm. The value of $\Delta h/R$ of the surface on the object side is 0.5834, and is 0.1826 for the opposite surface. In addition, the outer diameter of plano-concave lens element $L_1$ is 2.2 mm.

Table 2 below gives, in order from the object side, the surface number #, the radius of curvature R near the optical axis of each surface, the on-axis spacing d of each surface, the refractive index $n_d$ (at the sodium d-line) and the Abbe number v.

TABLE 2

| # | R | d | $n_d$ | v |
|---|---|---|---|---|
| 1 | ∞ | 0.3428 | 1.88300 | 40.78 |
| 2 | 0.6603 | 0.5764 | | |
| 3 | ∞ | 0.4000 | 1.52287 | 59.89 |
| 4 | ∞ | 0.2000 | | |
| 5 | 5.7000 | 0.7000 | 1.75512 | 45.60 |
| 6 | -1.3500 | 0.1123 | | |
| 7 | ∞ | 0.4000 | 1.52287 | 59.89 |
| 8 | ∞ | 0.2102 | | |
| 9 | 3.1923 | 0.2566 | 1.84666 | 23.83 |
| 10 | 1.1000 | 1.2000 | 1.51760 | 63.50 |
| 11 | -1.7357 | 0.3770 | | |
| 12 | ∞ | 1.6000 | 1.51760 | 63.50 |
| 13 | ∞ | 0.4000 | 1.52287 | 59.89 |
| 14 | ∞ | | | |

Embodiment 3

FIG. 3 shows the components of an optical system apparatus for an image pick-up for an endoscope according to Embodiment 3. The components include, in order from the object side: a plano-concave lens element $L_1$ with its concave surface on the image side, a plano-convex lens element $L_2$ with its convex surface on the object side, a plano-convex lens element $L_3$ with its convex surface on the image side, and parallel plates $F_1$, $P_1$ and $P_2$. Parallel plate $F_1$ is a filter which corrects the color temperature. Parallel plates $P_1$ and $P_2$ are bonded together, and parallel plate $P_2$ is the cover glass of the CCD array. An aperture is arranged between the plano-convex lens element $L_2$ and the plano-convex lens element $L_3$.

Moreover, plano-convex lens element $L_2$ and plano-convex lens element $L_3$ are formed by pressing a parallel plate optical material with a die. Plano-convex lens element $L_2$ is made of the optical material "SF13", which has a glass transition point of 456 degrees Centigrade and contains lead. This optical material is available from Sumita Optical Glass, Inc. (Japan). The outer diameter $\Phi$ of plano-convex lens element $L_2$ is 1.3 mm, its value of $\Delta h/R$ is 0.2577 on the object side. For plano-convex lens element $L_3$, the optical material "SFn3" is used. This optical material is also available from Sumita Optical Glass, Inc. (Japan). It has a glass transition point of 415 degrees Centigrade and contains lead. The outer diameter $\Phi$ of lens element $L_3$ is 1.5 mm, its value of $\Delta h/R$ is 0.3146 on the object side. In addition, the outer diameter of plano-concave lens element $L_1$ is 1.7 mm, and the outer diameter of parallel plate $F_1$ is 1.5 mm.

Table 3 below gives, in order from the object side, the surface number #, the radius of curvature R near the optical axis of each surface, the on-axis spacing d of each surface, the refractive index $n_d$ (at the sodium d-line) and the Abbe number v.

TABLE 3

| # | R | d | $n_d$ | v |
|---|---|---|---|---|
| 1 | ∞ | 0.3400 | 1.88300 | 40.76 |
| 2 | 0.6750 | 0.3100 | | |
| 3 | 0.9700 | 0.5800 | 1.74077 | 27.70 |
| 4 | ∞ | 0.0300 | | |
| 5 | ∞(stop) | 0.2000 | | |
| 6 | ∞ | 0.6200 | 1.84666 | 23.90 |
| 7 | -1.0300 | 0.0500 | | |
| 8 | ∞ | 0.6200 | 1.51400 | 75.00 |
| 9 | ∞ | 0.3000 | | |
| 10 | ∞ | 0.4000 | 1.51760 | 63.50 |
| 11 | ∞ | 0.7500 | 1.53172 | 48.91 |
| 12 | ∞ | | | |

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A lens element satisfying the following conditions:

$|\Delta h/R| \geq 0.1$ $\Phi \leq 8$ mm $Tg \leq 530°$ Centigrade where $\Delta h$ is the change in height of a surface of the lens element as measured from the lens element vertex to its edge, such that $\Delta h = R^2 - \{R^2 - (\Phi/2)^2\}^{1/2}$, R is the radius of curvature of the lens element surface near the optical axis, $\Phi$ is the outer diameter of the lens element, and Tg is the glass transition point of the optical material of the lens element.

2. The lens element of claim 1, wherein said lens element is formed by press molding an optical material.

3. The lens element of claim 2, wherein said optical material is planar prior to said lens element being formed by molding.

4. The lens element of claim 1, wherein said lens element is formed of an optical material which contains lead, and said glass transition point Tg is no more than 490 degrees Centigrade.

5. An optical system having multiple lens elements, said optical system including a lens element as set forth in claim 1.

6. An optical system having multiple lens elements, said optical system including a lens element as set forth in claim 2.

7. An optical system having multiple lens elements, said optical system including a lens element as set forth in claim 3.

8. An optical system having multiple lens elements, said optical system including a lens element as set forth in claim 4.

9. A method of manufacturing a glass lens element, said method comprising:

(a) using a mold to press an optical glass material into a shape satisfying the following conditions
$|\Delta h/R| \geq 0.1$
$\Phi \leq 8$ mm where $\Delta h$ is the change in height of a lens element surface as measured from the lens element vertex to its edge, such that $\Delta h = R^2 - \{R^2 - (\Phi/2)^2\}^{1/2}$, R is the radius of curvature of the lens element near the optical axis, and $\Phi$ is the outer diameter of the lens element; and (b) pressing glass at a temperature greater than the transition temperature of the glass, said glass containing lead and having a transition temperature less than or equal to 490 degrees Centigrade with said mold, with the temperature of the mold during the pressing being at a temperature less than a temperature which results in lead being precipitated from the glass onto a surface of the mold.

* * * * *